US010414102B2

(12) United States Patent
Kok et al.

(10) Patent No.: US 10,414,102 B2
(45) Date of Patent: Sep. 17, 2019

(54) DEVICE AND METHOD FOR PRODUCING A REINFORCING STRUCTURE ON THE SURFACE OF A MOULDING

(71) Applicant: KAUTEX TEXTRON GMBH & CO. KG, Bonn (DE)

(72) Inventors: Jakob Steven Marten Kok, Sprang-Capelle (NL); Patrick Koelzer, Muehlpfad (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 137 days.

(21) Appl. No.: 15/527,942

(22) PCT Filed: Nov. 10, 2015

(86) PCT No.: PCT/EP2015/076266
§ 371 (c)(1),
(2) Date: May 18, 2017

(87) PCT Pub. No.: WO2016/078979
PCT Pub. Date: May 26, 2016

(65) Prior Publication Data
US 2018/0345588 A1 Dec. 6, 2018

(30) Foreign Application Priority Data

Nov. 20, 2014 (DE) .......................... 10 2014 017 086

(51) Int. Cl.
*B29C 65/16* (2006.01)
*B29C 70/38* (2006.01)
(Continued)

(52) U.S. Cl.
CPC ........ *B29C 65/1632* (2013.01); *B29C 65/167* (2013.01); *B29C 65/1645* (2013.01);
(Continued)

(58) Field of Classification Search
CPC .................................................. B29C 65/1632
See application file for complete search history.

(56) References Cited

U.S. PATENT DOCUMENTS

| 6,451,152 | B1 | 9/2002 | Holmes et al. |
| 9,221,215 | B2 | 12/2015 | Hepp et al. |
| 2004/0060650 | A1 | 4/2004 | Holmes et al. |
| 2013/0025793 | A1 | 1/2013 | Le Monnier et al. |
| 2017/0107409 | A1 | 4/2017 | Harrington et al. |

FOREIGN PATENT DOCUMENTS

| DE | 102011055460 | 5/2012 |
| DE | 102012108487 | 3/2014 |

(Continued)

OTHER PUBLICATIONS

English translation of International Preliminary Report on Patentability dated May 26, 2017, received in corresponding PCT Application No. PCT/EP2015/076266.

(Continued)

*Primary Examiner* — Larry W Thrower
(74) *Attorney, Agent, or Firm* — Grossman, Tucker, Perreault & Pfleger, PLLC

(57) ABSTRACT

The present invention discloses a device for producing a reinforcing structure, which comprises a strip that is fiber-reinforced and comprises thermoplastic material, on the surface of a molding. The device is characterized in that a laser diode array is adapted for irradiating a radiation zone so as to bring about such an uneven intensity distribution on a heating-up area of a strip from which the reinforcing structure is formed that the radiation intensity on the heating-up area of the strip decreases at least in certain portions in a drawing direction R2.

19 Claims, 6 Drawing Sheets

(51) Int. Cl.
*B29C 65/00* (2006.01)
*B29C 35/08* (2006.01)
*B29K 101/12* (2006.01)
*B29L 31/00* (2006.01)

(52) U.S. Cl.
CPC ...... *B29C 65/1658* (2013.01); *B29C 66/1122* (2013.01); *B29C 66/45* (2013.01); *B29C 66/5326* (2013.01); *B29C 66/61* (2013.01); *B29C 66/636* (2013.01); *B29C 66/65* (2013.01); *B29C 66/7212* (2013.01); *B29C 66/73921* (2013.01); *B29C 66/8181* (2013.01); *B29C 66/83411* (2013.01); *B29C 66/9192* (2013.01); *B29C 70/38* (2013.01); *B29C 70/386* (2013.01); *B29C 2035/0838* (2013.01); *B29K 2101/12* (2013.01); *B29L 2031/7156* (2013.01)

(56) References Cited

FOREIGN PATENT DOCUMENTS

| JP | 2017-527645 | 9/2017 |
| WO | 2010/031364 | 3/2010 |
| WO | 2015/045407 | 10/2015 |

OTHER PUBLICATIONS

PCT International Search Report dated Feb. 24, 2016, received in corresponding PCT Application No. PCT/EP2015/076266.

"Vertical-cavity surface-emitting laser—Wikipedia, the free encyclopedia", Oct. 20, 2014, XP055236760. Cited in International Search Report.

Pistor M et al., "Crystallinity of on-line consolidated thermoplastic composites", Journal of Composite Materials, Sage Publications, U.S., vol. 33, No. 4, Jan. 1, 1999, pp. 306-324.

DEVICE AND METHOD FOR PRODUCING A REINFORCING STRUCTURE ON THE SURFACE OF A MOULDING

FIELD

The present invention relates to a device and a method for producing a reinforcing structure on a molded body surface.

BACKGROUND

Here, a molded body surface should be taken to mean any area or surface on a substrate of any design or on a molded body of any shape and dimensions.

For reasons connected with weight optimization, substrates and/or molded bodies are often formed from plastics. Correspondingly weight-optimized substrates and/or molded bodies can however also have a reduced stability. To increase stability, the substrates and/or molded bodies can be provided with a reinforcing structure. This reinforcing structure can be formed from fiber-reinforced thermosetting or thermoplastic materials, for example.

One example of a molded body or substrate is an inner container of a pressurized container. The inner container can be formed from a thermoplastic material, for example, or it can at least include a thermoplastic material. Pressurized containers are used to store pressurized gases and/or pressurized liquids. Thus, pressurized containers are already being used in motor vehicles operated on natural gas. Pressurized containers which are filled with pressurized hydrogen are furthermore known for motor vehicles. The hydrogen can be burned with oxygen in an internal combustion engine or can react with oxygen in a fuel cell to form water, wherein the electric energy obtained is fed to an accumulator or to an electric motor.

Corresponding pressurized containers must withstand high loads. Pressurized containers for natural gas are charged with a pressure of up to 250 bar, for example. Pressurized containers for hydrogen are charged with a pressure of up to 700 bar. The pressurized inner containers which form the interior of a pressurized container of this kind and are formed from a thermoplastic material, for example, must therefore be provided with an outer supporting structure which allows reinforcement of the pressurized inner container, ensuring that the pressurized container can withstand pressure loads of up to 700 bar.

The prior art has disclosed the practice of applying a supporting structure composed of thermoplastic material to a molded body, wherein the thermoplastic material can be of fiber-reinforced form, in particular reinforced with carbon fibers. In this case, a reliable and stable connection between the molded body and the supporting structure is necessary.

Thus, U.S. Pat. No. 6,451,152 describes a method for producing plastic articles from a plastic strip. For this purpose, opposite surfaces of a plastic strip and of a substrate are subjected to light radiation and are heated, wherein the light radiation is emitted by an edge emitter laser diode array. The laser light emitted by the edge emitter laser diode array has in this case, owing to the construction, a large divergence angle, such that imaging optics are arranged between the edge emitter laser diode array and the surfaces to be irradiated, in order that the intensities required for the heating of the surfaces can be achieved. In order that the plastic strip adheres to the substrate, the plastic strip is pressed onto the surface of the substrate by means of a contact pressure unit. According to the description of U.S. Pat. No. 6,451,152, the surfaces of the plastic strip and of the substrate can be locally irradiated with appropriate intensities, with the result that, in the case of application of the plastic strip to the substrate over a curve, the region of the plastic strip on the inside of the curve is heated more strongly to ensure that the plastic strip can be deposited on the substrate and joined to the latter more effectively in curved form.

SUMMARY

The underlying object of the present invention is to improve a device for producing a reinforcing structure on a surface of a molded body, which can alternatively also be referred to simply as a substrate, wherein the reinforcing structure comprises a fiber-reinforced strip including a thermoplastic material, wherein the device according to the invention for producing a reinforcing structure permits faster production of the reinforcing structure and furthermore improved adhesion of the plastic strip to the substrate.

The object underlying the present invention is achieved by a device for producing a reinforcing structure on a molded body surface having the features of claim 1. Advantageous embodiments are described in the claims dependent on claim 1.

The object underlying the present invention is furthermore achieved by a method for producing a reinforcing structure on a molded body surface having the features of claim 16. Advantageous embodiments are described in the claims dependent on claim 16.

To be more precise, the object underlying the present invention is achieved by a device for producing a reinforcing structure, which comprises a fiber-reinforced strip including a thermoplastic material, on a molded body surface. In this case, the device comprises a contact pressure unit for pressing the strip onto the molded body surface. The strip can be positioned between the contact pressure unit and the molded body surface in such a way that a contact pressure portion of the strip can be brought into contact with the contact pressure unit and the molded body surface, with the result that the strip can be subjected to a force in the direction of the molded body surface by means of the contact pressure unit. Consequently, the strip is arranged sandwich-fashion between the contact pressure unit and the molded body surface. The device furthermore comprises a translation and/or rotation unit, which is coupled in terms of motion to the molded body and/or to the contact pressure unit, with the result that a motion and/or a rotation of the molded body relative to the contact pressure unit can be achieved, whereby the strip can be applied to the molded body surface, wherein the contact pressure unit moves in a direction of relative motion with respect to the molded body surface, and the strip is pulled in a pulling direction in relation to the contact pressure unit. The device furthermore comprises at least one laser diode array having a multiplicity of laser diodes for irradiating a heating surface of the strip ahead of the contact pressure region of the strip in the pulling direction, and/or for irradiating a heating surface of the molded body after the contact pressure region in the direction of relative motion. The strip can be melted locally in the region of the heating surface thereof and/or the molded body surface can be melted locally in the region of the heating surface thereof by irradiation by means of the laser diode array, thus making it possible to join the strip to the molded body by pressing the strip onto the molded body surface by means of the contact pressure unit. The device according to the invention is characterized in that the laser diode array is adapted to emit a radiation field which causes such a nonuniform intensity distribution on the heating surface of the strip that the radiation intensity on the heating surface of the strip decreases in the pulling direction, at least in sections.

By means of a corresponding heating strategy, in which the radiation intensity on the heating surface of the strip decreases in the pulling direction, at least in sections, the irradiated side of the strip is heated more strongly at the start of the heating surface, i.e. in the region of the heating surface which is furthest away from the molded body surface, than just before the contact pressure region. This has the effect that the strip can thermalize better over the thickness thereof, i.e. the temperature of the rear side of the strip can adapt better to the temperature of the irradiated front side of the strip. This results in a more uniform temperature distribution over the thickness of the strip. Owing to the more uniform temperature distribution, the material of the strip has a more uniform viscosity over the thickness thereof, with the result that the strip is subject to lower mechanical stresses owing to the strip being pressed onto the molded body surface or onto the already formed reinforcing structure. By virtue of the more uniform temperature distribution over the thickness thereof, the strip furthermore has lower thermal stresses after cooling. These two effects lead to the joint between the strip and the molded body surface or the already formed reinforcing structure being more stable, with the result that the molded body provided with the reinforcing structure has an increased stability.

The mechanism of action here is as follows. At the start of the heating surface of the strip, said strip is strongly heated by means of the laser radiation since the intensity of the laser radiation is particularly high in the region of the start of the heating surface. Owing to the high temperature gradient over the thickness of the strip, there is accelerated temperature equalization in the direction of the thickness of the strip. During the further heating process of the strip by means of the radiation emitted by the laser diode array, the intensity of the laser radiation decreases in the direction of the pulling direction, with the result that the heating surface is heated at a slower rate. As a result, the front side of the strip, i.e. the side of the strip facing the molded body, is not heated above a material-specific maximum temperature, while, at the same time, temperature equalization of the rear side to the front side of the strip is achieved.

By means of the device according to the invention, it is furthermore possible also to use thicker strips to produce the reinforcing structure. This is because, by virtue of the heating strategy according to the invention, even relatively thick strips can be thermalized over the thickness thereof. Owing to the use of thicker strips, which can of course also have a larger number of fibers, in particular carbon fibers, fewer individual layers of the strip have to be applied to the molded body surface to produce the reinforcing structure, thus shortening the time for the production of the reinforcing structure.

Of course, it is not necessary for the radiation intensity on the heating surface of the strip to decrease monotonically in the pulling direction. Radiation intensity profiles in the pulling direction on the heating surface of the strip with partially rising intensities in the pulling direction are also possible, provided only that it is ensured that the radiation intensity on the heating surface of the strip decreases in the pulling direction, at least in sections.

The wavelength of the laser light emitted by the laser diode array is preferably in the infrared range. For example, the wavelength can be in a range of from 780 nm to 1500 nm. The use of infrared radiation is particularly advantageous since infrared radiation is absorbed particularly well by thermoplastic materials.

The translation and/or rotation unit can comprise a handling unit, for example, e.g. a robot, for moving and/or rotating the contact pressure unit and another handling unit for moving and/or rotating the molded body.

Here, the molded body can have any desired geometry. In the simplest case, the molded body is designed as a flat substrate. Of course, it is also possible for the molded body to have more complex geometries, e.g. a cylindrical geometry, which, in particular, an inner container of a pressurized container has.

If the intention is, for example, to provide an inner container with a reinforcing structure, the translation and/or rotation unit can comprise a robot arm on which the laser diode array is arranged. Furthermore, the translation and/or rotation unit can then comprise a rotary spindle, on which the pressurized container or the inner container is arranged. The container can be rotated relative to its longitudinal axis by means of the rotary spindle. The rotary spindle itself can furthermore be rotatable about a rotation axis perpendicular to the longitudinal axis of the inner container. The molded body, e.g. an inner container of a pressurized container to be produced, can be formed, in particular, from a thermoplastic material or can at least include the latter. For example, an outer surface of the molded body can be composed of a thermoplastic material. In this case, the strip and the molded body are joined materially.

Of course, however, the molded body can also be composed of a metal, in which case the strip and the molded body are joined positively and/or nonpositively.

The reinforcing structure to be applied to the molded body surface can also be referred to as a supporting structure or as a stiffening structure.

The device furthermore preferably comprises a heating unit, by means of which the strip ahead of the heating surface in the pulling direction can be heated to a predetermined temperature.

This ensures that, over the limited length of the heating surface of the strip, said strip has to thermalize over a reduced temperature difference between a front side and a rear side of the strip. There can therefore be a further improvement in the thermalization of the strip over the thickness thereof, thereby making it possible to achieve even lower mechanical stresses as the strip is pressed into contact and also lower thermally induced stresses after the cooling of the strip on the molded body. Moreover, even thicker plastic strips can be used to form the reinforcing structure, further reducing the time for the production of the reinforcing structure.

In the simplest case, it is possible to use a heating tunnel as a heating unit, through which tunnel the plastic strip is pulled before being applied to the molded body surface. It is furthermore possible to use infrared diodes, by means of which the front side and/or the rear side of the strip can be irradiated. A heating gas flow for the front side and the rear side of the strip is also possible.

The device preferably comprises a second laser diode array in addition to the first laser diode array, the latter being designed to heat the heating surface of the strip, which heating surface is to be brought into contact with the molded body, said second laser diode array comprising a multiplicity of laser diodes for irradiating a rear side of the strip situated opposite the heating surface of the strip.

By means of the second laser diode array, it is ensured that the strip has even more uniform temperature distribution over the entire thickness thereof. The strip's rear side irradiated by the second laser diode array is preferably arranged directly opposite the heating surface of the strip, with the result that the strip is heated from the two surfaces thereof in the heating region.

A corresponding design of the device has the effect that even lower thermal stresses of the reinforcing structure are achieved after curing or cooling since the strip is even better thermalized before application to and pressing onto the molded body surface. With a corresponding device, it is furthermore also possible to use even thicker plastic strips, making it possible to achieve a shorter cycle time for the production of the product having the reinforcing structure.

The device is preferably designed in such a way that at least one laser diode array is adapted to irradiate the heating surface of the molded body after the contact pressure region in the direction of relative motion, wherein the laser diode array is furthermore adapted to emit a radiation field which causes such a nonuniform intensity distribution on the heating surface of the molded body that the radiation intensity on the heating surface of the molded body decreases counter to the direction of relative motion, at least in sections.

Consequently, at least in sections, the heating surface of the molded body is at least heated more strongly in the initial region of the heating zone than toward the end of the heating surface. This ensures that the surface of the molded body too can thermalize down to a predetermined depth, thus reducing the stresses in the reinforcing structure after the strip has been pressed on and after the cooling of the reinforcing structure and of the strip.

The device can preferably be designed in such a way that the laser diode array/the laser diode arrays is/are adapted to heat the respective heating surfaces of the strip and of the molded body to different temperatures in the region immediately ahead of a line of contact of the strip with the molded body.

This makes it possible for the molded body and the strip to be formed from different thermoplastic materials, which may have different optimum temperatures for welding, or at least to include said thermoplastic materials.

The contact pressure unit is preferably designed as a contact pressure roller, the outer surface of which is formed from an elastomeric material, with the result that the contact area between the contact pressure roller and the strip increases as the strip is pressed onto the molded body or onto the molded body surface with an increasing force by means of the contact pressure roller.

This increases the joining region between the plastic strip and the molded body surface, thus allowing force to be imposed on the region of contact over an extended time, making possible a closer connection between the plastic strip and the substrate or molded body surface. This, in turn, further increases the stability of the reinforcing structure thus produced.

The device is preferably designed in such a way that the contact pressure unit in the region that can be brought into contact with the strip and with the molded body is of a substantially transparent for the radiation emitted by the laser diode array/laser diode arrays.

This ensures that the contact pressure roller or contact pressure unit is heated to a reduced extent by the laser radiation, this in turn ensuring a reduced heat input to the molded body. Particularly in the case where the molded body is composed of a thermoplastic material or includes a thermoplastic material, the structural integrity of the molded body is reduced to a lesser degree.

Here, the feature according to which the contact pressure unit is substantially transparent for the radiation emitted by the laser diode array means that the transmissivity of the material for the radiation is greater than 75%, preferably greater than 80%, as a further preference greater than 85%, as a further preference greater than 90%, and most preferably greater than 95%.

The device is preferably designed in such a way that the emission direction vectors of at least two laser diodes are aligned in a nonparallel manner to one another and are directed toward one another in the direction of the heating surface/heating surfaces.

As a result, it is possible to achieve an increased radiation intensity on the heating surface/heating surfaces since it is possible to at least partially compensate the beam divergence of the individual laser diodes through the arrangement of the laser diodes. It is furthermore possible, by appropriate design of the device, for the laser diode array to have a relatively large clearance with respect to the heating surfaces of the strip and/or of the molded body. Moreover, it is thereby possible to eliminate the need for separate collimation optics between the laser diode array and the heating surface or heating surfaces to achieve intensities necessary for heating at the heating surfaces. The overall device is thereby considerably simplified and also more advantageous in terms of the costs thereof.

The device is preferably designed in such a way that it comprises an irradiation module which comprises a laser diode array and which, in turn, has at least two emission surfaces, each facing the heating surface of the strip and/or the heating surface of the molded body. At least one laser diode of the laser diode array is arranged in each of the emission surfaces, wherein the emission direction vector of the laser diode is oriented parallel to the normal vector of the emission surface. In this arrangement, an angle enclosed by two adjacent emission surfaces is capable of being changed.

However, the present invention is not restricted to only one angle of two mutually adjacent emission surfaces being variable or capable of being changed. On the contrary, all the angles of emission surfaces of the irradiation module can be adjusted or changed. The angles of mutually adjacent emission surfaces can be changed electromechanically. For example, individual components of the irradiation module can be arranged on turntables, allowing the angular orientation of individual segments of the irradiation module to be changed relative to one another in this way. It is also possible to change the angular position of the individual segments of the irradiation module by means of piezoelectric elements.

Customary angle variations of the individual segments of the irradiation module are usually in an angular range of between 0.1° and 10°. As a further preference, the angle variations between the individual segments of the irradiation module are between 0.1° and 5°. As a further preference, the angle variations between the individual segments are between 0.2° and 3°. As the most preferred option, the angle variations are between 0.3° and 1°.

Through appropriate design of the device according to the invention, it is not only possible for the intensity profile on the heating surface or heating surfaces to be implemented by changing the current strength of the individual laser diodes; on the contrary, it is also possible, in addition or as an alternative, for different beam cones emitted by the respective laser diodes to be made to overlap by angle variations of the individual segments, thereby making it possible to achieve further capacity for changing the intensity profile on the heating surface or heating surfaces.

An appropriately designed device for producing a reinforcing structure on a molded body surface is capable of even more flexible adjustment to different geometries of molded bodies. With an appropriately designed device, it is furthermore also possible for strips of different widths to be heated without material surrounding the strip being subjected unnecessarily to laser radiation as well.

The device is preferably designed in such a way that it comprises an irradiation module which comprises a laser diode array and, in turn, has at least two emission surfaces, each facing the heating surface of the strip and/or the heating surface of the molded body. At least one laser diode of the laser diode array is arranged in each of the emission surfaces, wherein the emission direction vector of the laser diode is oriented parallel to the normal vector of the emission surface. In this arrangement, the normal vectors of the emission surfaces are aligned in a nonparallel manner to one another and are directed toward one another in the direction of the heating surface/heating surfaces.

For example, the individual segmented emission surfaces of the irradiation module can be bounded by a concave envelope.

In another preferred embodiment, the device is designed in such a way that it comprises an irradiation module which comprises a laser diode array and which has at least one emission surface facing the heating surface of the strip and/or the heating surface of the molded body. In this arrangement, the emission surface/emission surfaces is/are of concave design, and the laser diodes of the laser diode arrays are arranged spaced apart in the emission surface, wherein the respective emission direction vectors of the laser diodes are oriented parallel to the local normal vectors of the emission surface surrounding them, with the result that the emission direction vectors of at least two laser diodes are aligned in a nonparallel manner to one another and are directed toward one another in the direction of the heating surface/heating surfaces.

The two last-described embodiments of the device have the advantage that the beam divergence of the individual laser diodes can be compensated, thus making it possible to achieve increased laser light intensities on the heating surfaces of the strip and of the molded body. It is thereby furthermore made possible to avoid imaging optics between the laser diode array and the heating surface of the strip or the heating surface of the body.

The device is preferably designed in such a way that the laser diodes of the laser diode array are spaced apart in a non-equidistant manner, at least in some cases.

By means of the non-equidistant spacing of the laser diodes, the nonuniform radiation intensity on the heating surface of the strip and/or on the heating surface of the molded body can be achieved or assisted. Moreover, nonuniform spacing of the laser diodes relative to one another makes it possible to achieve a desired intensity distribution, e.g. uniform intensity distribution, on the heating surfaces, despite the nonparallel emission direction vectors.

For example, spacings between laser diodes which irradiate the heating surfaces at a relatively large angle, the spacings between these laser diodes can be smaller than the spacings between the laser diodes which irradiate the heating surfaces at a more acute angle or approximately perpendicularly.

The device is preferably designed in such a way that the laser diodes of the laser diode array are designed as surface emitters.

By using surface emitters, which can also be referred to as surface emitting laser diodes or VCSEL (vertical cavity surface emitting laser), it is possible to achieve higher radiation outputs per surface unit on the strip and/or on the molded body without necessarily having to arrange imaging optics between the laser diode array and the strip and/or the molded body. This is because the beam divergence of surface emitters is considerably less than the beam divergence of "edge emitters".

Consequently, it is also possible, given an appropriately designed device, to increase a spacing between the laser diode array and the heating surface or the heating surfaces of the strip and the molded body.

As a further preference, however, it is also possible for collimation imaging optics to be arranged between the laser diode array and the heating surface of the plastic strip and/or the heating surface of the molded body. By using the collimation imaging optics, it is possible to achieve even greater radiation intensities on the heating surfaces of the strip and/or of the molded body.

The emission outputs of the individual laser diodes of the laser diode array can preferably be set separately by means of a control unit.

This makes it possible, in the case of determination of the temperatures of the heating surfaces of the strip and of the molded body in a manner dependent on the respective temperatures, for the individual laser diodes to be controlled in a corresponding manner, ensuring that the plastic strip and the molded body surface preferably have identical temperatures in the region of contact between them. This can be performed in a closed feedback structure, for example.

The device is preferably designed such that the reinforcing structure is a supporting sleeve of a pressurized container and the molded body is an inner container of the pressurized container.

The object underlying the present invention is furthermore achieved by a method for producing a reinforcing structure on a molded body surface, wherein the reinforcing structure comprises a fiber-reinforced strip including a thermoplastic material. Here, the method has the following method steps:

positioning the strip between a contact pressure unit and a molded body surface in such a way that a contact pressure portion of the strip is in contact with the contact pressure unit and the molded body surface;

subjecting the contact pressure unit to a force in the direction of the molded body surface, such that the strip is pressed onto the molded body surface;

moving and/or rotating the molded body relative to the contact pressure unit such that the molded body and the contact pressure unit perform a relative movement and/or a relative rotation with respect to one another, whereby the strip is applied to the molded body surface, wherein the contact pressure unit moves in a direction of relative motion with respect to the molded body surface, and the strip is pulled in a pulling direction in relation to the contact pressure unit;

irradiating a heating surface of the strip ahead of the contact pressure region of the strip in the pulling direction, and/or irradiating a heating surface of the molded body after the contact pressure region in the direction of relative motion, by means of a multiplicity of laser diodes of a laser diode array; and locally melting the strip in the region of the heating surface thereof and/or the molded body surface in the region of the heating surface thereof by means of the laser diode array, such that the strip is joined to the molded body by pressing the strip onto the molded body surface by means of the contact pressure unit.

The method according to the invention is characterized in that the laser diode array is controlled such that the laser diode array emits a radiation field which causes such a nonuniform intensity distribution on the heating surface of the strip that the radiation intensity on the heating surface of the strip decreases in the pulling direction, at least in sections.

It is preferably provided that, before the irradiation of the heating surface, the strip ahead of the heating surface in the pulling direction is heated to a predetermined temperature by means of a heating unit.

It is furthermore preferably provided that a rear side of the strip situated opposite the heating surface of the strip is heated by means of a second laser diode array.

It is furthermore preferably provided that the laser diode array emits a radiation field which causes such a nonuniform intensity distribution on the heating surface of the molded body that the radiation intensity on the heating surface of the molded body decreases counter to the direction of relative motion, at least in sections.

BRIEF DESCRIPTION OF THE DRAWINGS

Further advantages, details and features of the invention will become apparent below from the illustrative embodiments explained. In particular.

DETAILED DESCRIPTION

In the following descriptions, identical reference signs denote identical components or identical features, and therefore a description of a component given in relation to one figure also applies to the other figures, thereby avoiding repeated description. Moreover, the various features of the individual embodiments can be freely combined with one another.

Figure 1:
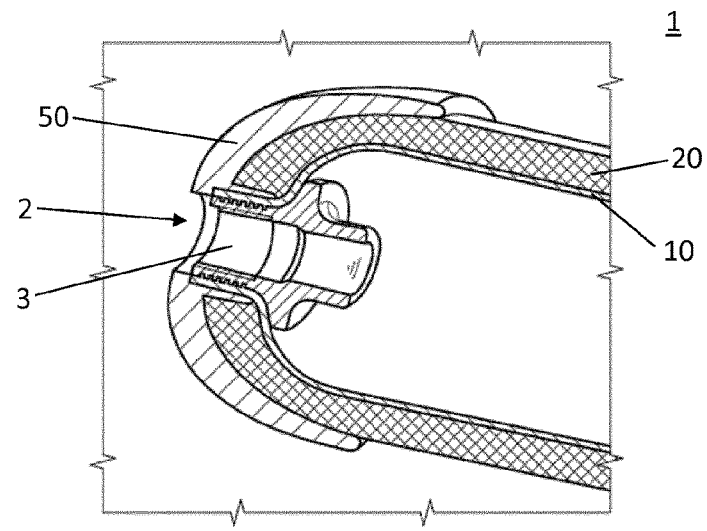
FIG. 1 shows a three-dimensional illustration of a pressurized container, which has been cut open.

In FIG. 1, a pressurized container 1 is shown in three dimensions in section. The pressurized container 1 comprises an inner container 10, which is usually composed of a thermoplastic material. At the least, however, an outer surface of the inner container 10 is formed from a thermoplastic material. As can furthermore be seen from FIG. 1, an opening 2 of the pressurized container 1 is formed by a connection element 3. To be more precise, the opening 2 is formed by a neck portion of the connection element 3. A shoulder portion and a neck portion of the connection element 3 are connected materially and/or nonpositively and/or positively, for example, to the inner container 10 of the pressurized container 1.

To ensure that the pressurized container 1 is also suitable for holding pressurized gases or liquids, the inner container 10 must be provided with a reinforcing structure 20 in the form of a supporting sleeve 20. Here, the supporting sleeve 20 surrounds the entire inner container 10 of the pressurized container 1, ensuring that, when the pressurized container 1 is subjected to pressure, it exhibits considerably reduced expansion. Moreover, it is only through the provision of the supporting sleeve 20 that pressurization of the pressurized container 1 with pressures between 250 bar and 700 bar is made possible.

It can furthermore be seen from FIG. 1 that the end region of the pressurized container 1 is provided with an impact protector 50 in the form of a cap 50. The cap 50 distributes forces exerted axially on the pressurized container 1 over a larger area. These forces in at least one axial direction can occur if the pressurized container is involved in an accident or falls, for example.

Figure 2:
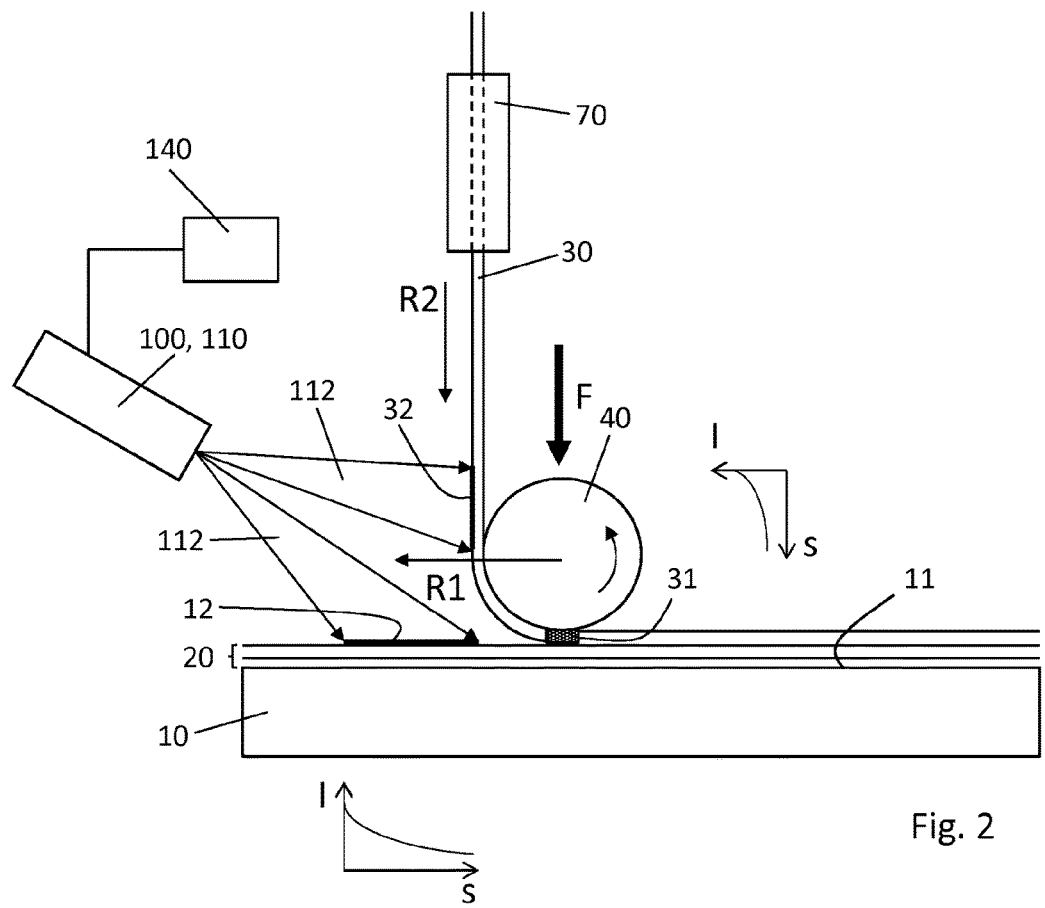
FIG. 2 shows a schematic illustration of a device according to the invention for producing a reinforcing structure.

FIG. 2 illustrates, in schematic form, a device for producing a reinforcing structure 20, which comprises a fiber-reinforced strip 30 including thermoplastic material, on a molded body surface 11. In the illustrative embodiment shown in FIG. 2, the molded body 10 is a flat substrate 10. However, the present invention is not restricted to providing a flat substrate 10 with a reinforcing structure 20. On the contrary, the device according to the invention can be used to provide substrates 10 or molded bodies 10 of any geometrical design and any dimensions with a reinforcing structure 20. Thus, in particular, it is possible with the device according to the invention to provide an inner container 10 illustrated in FIG. 1 with a supporting sleeve 20, wherein the reinforcing structure 20 designed as a supporting sleeve 20 comprises a fiber-reinforced strip 30 including a thermoplastic material. The strip 30 can be fiber-reinforced by means of glass fibers or, preferably, by means of carbon fibers, for example.

The device according to the invention comprises a contact pressure unit 40 designed as a contact pressure roller 40 for pressing the strip 30 onto the molded body surface 11 or onto the surface 11 of the already formed reinforcing structure 20. In this case, the strip 30 is arranged sandwich-fashion between the molded body 10 and the contact pressure roller 40. The strip 30 is therefore positioned in such a way between the contact pressure roller 40 and the molded body surface 11 that a contact pressure portion 31 of the strip 30 is in contact with the contact pressure roller 40 and the molded body surface 11 or with the surface of an already produced reinforcing structure 20, thus enabling the strip 30 to be subjected to a force in the direction of the molded body surface 11 by means of the contact pressure roller 40.

Figure 8:
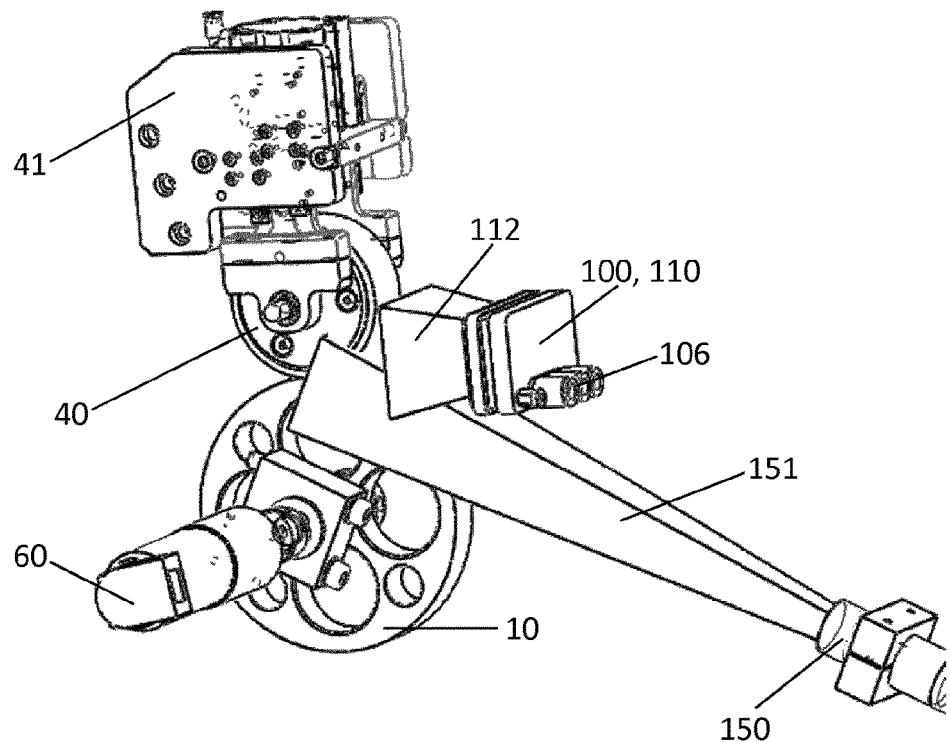
FIG. 8 shows a three-dimensional illustration of the device according to the invention for producing a reinforcing structure.
Figure 9:
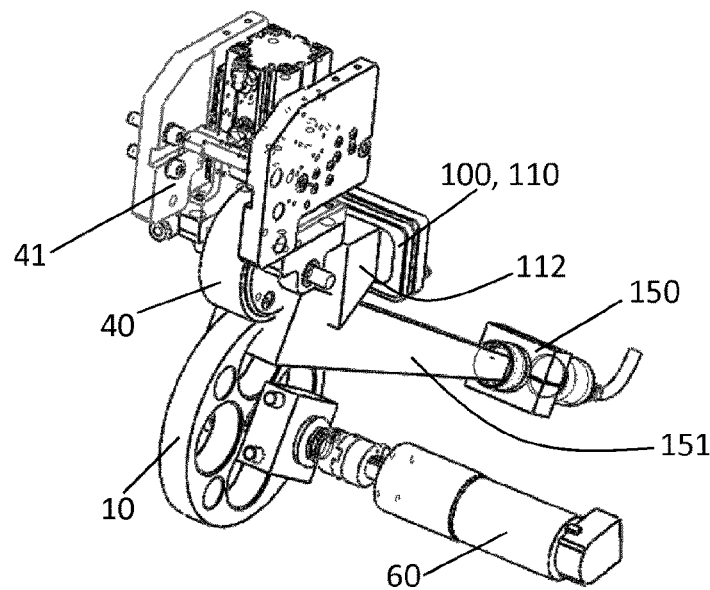
FIG. 9 shows the device illustrated in FIG. 8 from a different viewing angle.

From FIGS. 8 and 9, it can be seen that the device furthermore comprises a translation and/or rotation unit 60, which is coupled in terms of motion to the molded body 10 and/or to the contact pressure roller 40, with the result that a motion and/or a rotation of the molded body 10 relative to the contact pressure roller 40 can be achieved. In the illustrative embodiment shown in FIGS. 8 and 9, only one rotation unit 60, by means of which the molded body 10 can be rotated, is illustrated. However, the translation and/or rotation unit 60 furthermore also comprises a robot arm, for example (not shown in the figures), by means of which an irradiation module 100 can be made to translate and/or rotate relative to the contact pressure roller 40 and relative to the molded body 10. The translation and/or rotation unit 60 enables the strip 30 to be applied to the molded body surface 11, wherein the contact pressure roller 40 moves in a direction of relative motion R1 with respect to the molded body surface 11, as a result of which, in turn, the strip 30 is pulled or unrolled from a feed roller (not shown in the figures), for example, in a pulling direction R2 in relation to the contact pressure roller 40.

The device furthermore comprises at least one irradiation module 100, which, in turn, comprises at least one laser diode array 110. The laser diode array 110, in turn, comprises a multiplicity of laser diodes 111 (see FIGS. 10 and 11). The irradiation module 100 is arranged opposite a region of contact of the strip 30 with the molded body 10, with the result that, by means of the irradiation module 100, to be more precise by means of the laser diode array 110, a heating surface 32 of the strip ahead of the contact pressure region 31 of the strip 30 in pulling direction R2 and a heating surface 12 of the molded body 10 after the contact pressure region 31 in the direction of relative motion R1 are made possible. As can be seen from FIG. 1, the laser diode array 110 produces two beam cones 112, wherein the heating surface 32 of the strip 30 is irradiated by means of the upper beam cone 112 illustrated and the heating surface 12 of the molded body surface 11 or the already formed reinforcing structure 20 is irradiated by means of the cone 112 illustrated toward the bottom in FIG. 2.

Of course, it is also possible for just one single radiation cone 112 to be emitted by the irradiation module 100 or by the laser diode array 110 (see FIGS. 6 to 9). Moreover, the radiation field emitted by the laser diode array 110 can be such that the radiation intensity I on heating surface 12 or heating surface 32 has the desired value, despite a variable angle of incidence of the radiation field on the strip 30 or on the molded body 10, i.e. if heating surface 32 and/or heating surface 12 is/are of curved configuration. In concrete terms, this means that the radiation intensity I on the heating surfaces 12, 32 can be constant or decreasing at least in sections or increasing at least in sections, despite a variable angle of incidence of the laser radiation on heating surface 12 and/or heating surface 32. To this extent, there are no restrictions.

Through irradiation of the heating surface 32 of the strip 30 and of the heating surface 12 of the molded body 10 or of the heating surface 12 of the already formed reinforcing structure 20, the strip 30 is melted locally in the region of the heating surface 32 thereof, and the molded body surface 11 or the reinforcing structure 20 is melted locally in the region of the heating surface 12 thereof, with the result that the strip 30 is joined to the molded body 10 by pressing the strip 30 onto the molded body surface 11 by means of the contact pressure roller 40. To ensure that a close connection between the strip 30 newly applied to the already formed reinforcing structure 20 and the reinforcing structure 20 or the surface of the molded body 10 is achieved, a force F directed toward the molded body surface 11 is exerted on the contact pressure roller 40.

The device according to the invention is designed in such a way that the laser diode array 110 is adapted to emit a radiation field which causes nonuniform intensity distribution on the heating surface 32 of the strip 30. The intensity distribution on heating surface 32 is such that the radiation intensity on heating surface 30 decreases in the pulling direction R2, at least in sections. In the case of the intensity profile, illustrated schematically on the right in FIG. 2, of the radiation field on heating surface 32, the intensity is shown as decreasing monotonically over the length of heating surface 32. However, the present invention is not restricted to a corresponding intensity profile; on the contrary, the laser diode array 110 can be designed in such a way that any desired intensity profiles over the length of heating surface 32 are made possible, provided only that it is still ensured that the intensity decreases, at least in sections, i.e. over a partial section of the length of heating surface 32.

Corresponding irradiation of the heating surface 32 of the strip 30 has the effect that, at the start of irradiation of heating surface 32, i.e. in that region of heating surface 32 which is furthest away from the molded body 10, the strip 30 or the front side of the strip 30 is heated to the maximum extent, with the result that there is a large temperature difference between a front side and a rear side of the strip 30. In this case, the front side of the strip 30 is the side facing the irradiation module 100. Owing to the large temperature gradient between the front side of the strip 30 and the rear side thereof, there is rapid thermalization of the strip 30 over the thickness thereof. Through reduction of the irradiation intensity on heating surface 32 in the direction of the pulling direction R2, the front side of the strip 30 is furthermore heated up or held at a temperature, but the rear side of the strip 30 has sufficient time to adjust to the temperature of the front side of the strip 30.

This has the effect that a very largely thermalized strip 30 is arranged between the contact pressure roller 40 and the molded body 10 or the reinforcing structure 20 formed. By virtue of the thermalization of the strip 30 over the thickness thereof, there is a uniform deformation of the strip 30 owing to the strip 30 being pressed onto the molded body surface 11 or onto the surface of the already formed reinforcing structure 20, with the result that the reinforcing structure 20 exhibits lower mechanical stresses. Moreover, the reinforcing structure 20 exhibits reduced stress after cooling, with the result that the reinforcing structure 20 is more stable than in the case of conventional devices, known from the prior art, for producing a reinforcing structure.

As can be seen from FIG. 2, the laser diode array 110 is furthermore designed to heat a heating surface 12 of the molded body or of the already formed reinforcing structure 20, said heating surface being arranged after the contact pressure region 31 in the direction of relative motion R1. In this case, the laser diode array 110 is designed in such a way that a radiation field on heating surface 12 is produced, that such a nonuniform intensity distribution is brought about on heating surface 12 that the radiation intensity on heating surface 12 decreases counter to the direction of relative motion R1, at least in sections. An intensity profile over the length of heating surface 12 is illustrated schematically below the molded body 10.

In the illustrative embodiment shown, the intensity decreases monotonically over the length s of heating surface 12. However, the present invention is not restricted to a corresponding intensity profile since the intensity can have any desired profile dependent on the length s, provided only that it is still ensured that the intensity profile decreases over a section of the length s.

A corresponding design of the laser diode array 110 has the effect that the surface 11 of the substrate 10 or the surface 11 of the already formed reinforcing structure 20 has sufficient time to thermalize since, at the start of the length of heating surface 12, said surface is acted upon with a high intensity, with the result that a large temperature difference is caused between an upper side and a lower side of the reinforcing structure 20, with the result that increased temperature transfer is achieved. The intensity then decreases continuously over the length s of heating surface 12, with the result that a lower heat input into the already formed reinforcing structure 20 is achieved.

By pressing the strip 30 into contact in the region of the contact pressure portion 31, the heated strip 30 is pressed together with the heated reinforcing structure 20, wherein it is the case both that the strip 30 is very largely thermalized over the thickness thereof and that the reinforcing structure 20 is thermalized over a predetermined thickness, with the result that, after the strip 30 has been pressed together with the already formed reinforcing structure 20 and subsequently cooled, lower thermal stresses remain, thus ensuring that the reinforcing structure 20 has an increased stability.

It can be seen from FIG. 2 that the irradiation module 100 and, in particular, the laser diode array 110 are connected to a control unit 140 for the transmission of data. By means of the control unit 140, the intensity emitted by the individual diodes 111 of the laser diode array 110 is freely adjustable.

Although not illustrated in FIG. 2 or in the other figures, the control unit 140 can furthermore be coupled to the translation and/or rotation unit 60, thus making possible irradiation both of the strip 30 and of the molded body 10 or of the already formed reinforcing structure 20 in a manner that is coordinated with the positioning of the irradiation module 100 relative to the molded body 10.

As can furthermore be seen from FIG. 2, the device furthermore comprises a heating unit 70, by means of which the strip 30 situated ahead of heating surface 32 in the pulling direction R2 can be heated to a predetermined temperature. In this case, the heating unit 20 can be formed, for example, by infrared radiating elements, in particular by infrared diodes, which irradiate both the front side and the rear side of the strip 30. However, the heating unit 70 can also be implemented as a furnace 70, through which the strip 30 is pulled. It is furthermore possible for the heating unit 70 to heat the strip 30 on the front side and rear side thereof by means of hot air.

Here, the heating unit 70 ensures that the strip is heated to a predetermined temperature both on the front side and on the rear side thereof and thus also over the thickness thereof, wherein this temperature is below the melting temperature of the thermoplastic material of the strip 30.

Since the strip 30 has then already been pre-heated to a temperature, all that is required is that the strip 30 should be heated further by a reduced temperature by means of the laser light emitted by the laser diode array 110 in order to be joined materially to the surface 11 of the molded body 10 or of the already formed reinforcing structure 20, e.g. by welding.

The heating unit 70 brings about further improved thermalization of the strip 30, as a result of which even lower thermal stresses remain in the reinforcing structure 20 after said structure cools, whereby the reinforcing structure 20 has a further increased stability.

It is furthermore also possible to use strips 30 with a greater thickness since the strip 30 is heated and thus thermalized both on the front side and on the rear side thereof. Thus, relatively thick strips 30 can be applied to a molded body 10, ensuring that fewer individual layers of strip material are required to produce a reinforcing structure 20, thus reducing the cycle time for the production of a molded body 10 having a reinforcing structure 20.

The wavelength of the laser light emitted by the irradiation module 100 and, to be more precise, by the laser diode array 100 is preferably in the infrared range, in particular in the wavelength range between 750 nm and 1400 nm. In this wavelength range, the thermoplastic materials from which the strip 30 and the molded body 10 are formed have particularly high absorption coefficients.

The contact pressure roller 40 and, in particular, the outer surface of the contact pressure roller 40 are of a substantially transparent for the radiation emitted by the laser diode array 110 in the region which can be brought into contact with the strip 30 and with the molded body 10. Furthermore, the contact pressure roller 40 and, in particular, the outer surface of the contact pressure roller 40 can be formed from an elastomeric material, with the result that, as the strip 30 is pressed onto the molded body 10 by means of the contact pressure roller 40, the contact area between the contact pressure roller 40 and the strip 30 increases as the force increases.

Figure 3:
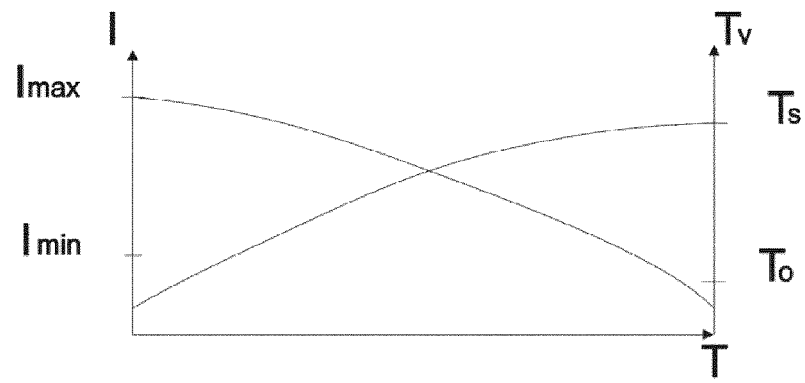
FIG. 3 shows a diagram intended to illustrate a laser light intensity profile and a temperature profile of a surface of a strip from which the reinforcing structure is formed.

The intensity profile of the radiation field on heating surface 32 and the temperature profile of the front side of the strip 30 is illustrated schematically in FIG. 3 as a function of the length s of heating surface 32. At the upper end of heating surface 32, the intensity is greatest, with the result that the front side of the strip 30 is heated to the greatest extent. Consequently, the temperature gradient is also greatest at the start of heating surface 32. In the pulling direction R2, i.e. along the length of heating surface 32 facing the molded body, the intensity decreases continuously from the maximum intensity Imax to a minimum intensity Imin, with the result that the temperature of the front side of the strip 30 increases more slowly in the pulling direction R2, until the temperature of the front side has been heated from the starting temperature T0 of the strip 30 to a setpoint temperature Ts.

Figure 4:
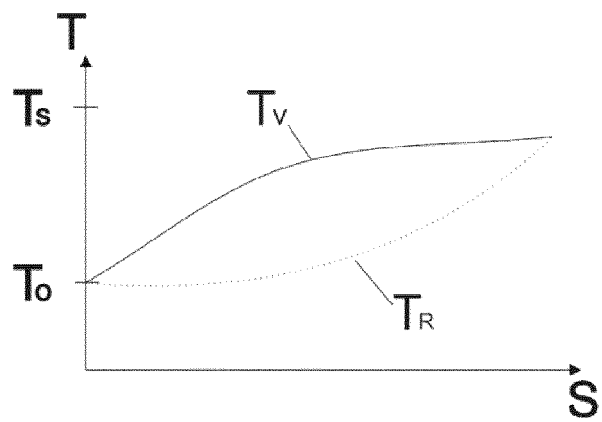
FIG. 4 shows a diagram for the locally resolved representation of the temperature of the strip on the front side thereof and on the rear side thereof.

FIG. 4 illustrates schematically the temperature profile of the front side of the strip Tv and of the temperature of the rear side Tr of the strip 30. It is apparent that the temperature of the front side Tv is raised relatively quickly to the setpoint temperature Ts, and the temperature of the rear side Tr of the strip 30 rises in a delayed manner to the setpoint temperature Ts. However, it is apparent that the temperature of the front side Tv and the temperature of the rear side Tr of the strip 30 are substantially identical to one another at the end of the length of the heating surface 32.

Figure 5:
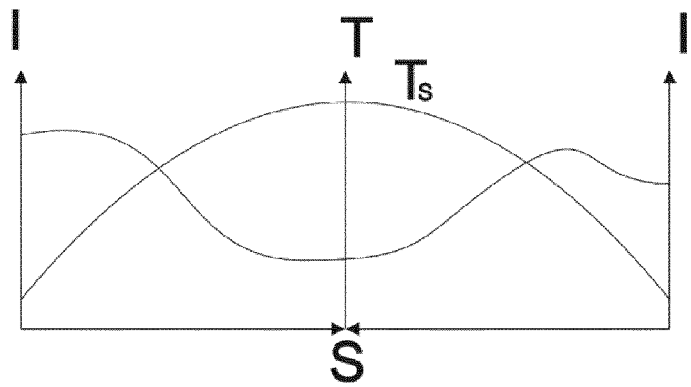
FIG. 5 shows an illustration of the intensity and temperature profiles on the heating surfaces of the strip and of the molded body.

FIG. 5 illustrates schematically the intensity profile and the temperature profile for the heating surface 32 of the strip 30 along the length s, and the intensity profile and temperature profile along the length s counter to the direction of relative motion R1 of the heating surface 12 of the already formed reinforcing structure 20. It can be seen from FIG. 5 that the intensity profile on the heating surface 32 of the strip 30 falls from a high intensity I to a lower intensity I, wherein the temperature of the strip rises continuously from an initial temperature to a setpoint temperature Ts. The same applies to the intensity profile on heating surface 12. The intensity decreases continuously counter to the direction of relative motion R1, whereas the temperature of heating surface 12 increases continuously counter to the direction of relative motion R1, namely to the setpoint temperature Ts.

Both the strip 30 and the surface 11 of the molded body 10 or the surface of the already formed reinforcing structure 20 are heated preferably to the same temperature Ts, with the result that minimal thermal stresses and, if possible, no thermal stresses remain after the cooling of the reinforcing structure 20.

Figure 6:
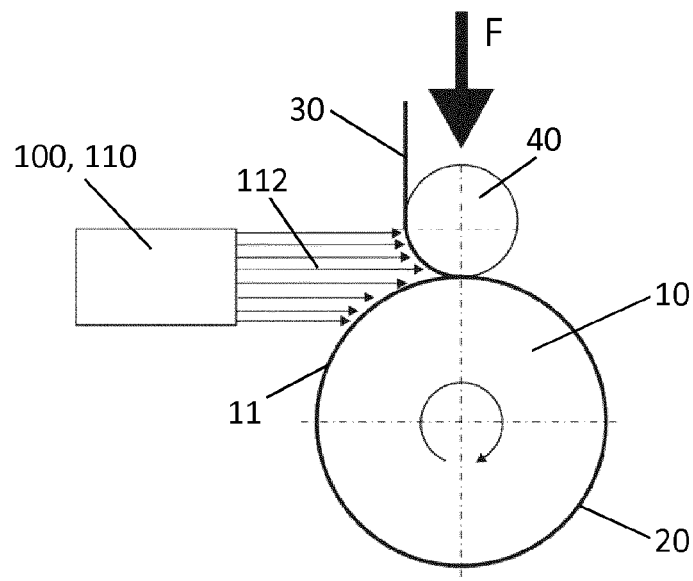
FIG. 6 shows a schematic section through a device according to the invention for producing a reinforcing structure, wherein an inner container of a pressurized container is illustrated as a molded body.

FIG. 6 illustrates the device from FIG. 1 once again in simplified form, wherein an inner container 10 (shown in cross section) of a pressurized container 1 is now illustrated as the molded body 10. Furthermore, the laser diode array 110 is designed to emit just a single beam cone 112, by means of which both the strip 30 and the inner container 10 or the reinforcing structure 20 already formed on the inner container 10 are irradiated. However, the other functionality is identical with the functionality of the device illustrated in FIG. 2, and therefore attention is drawn to the description relating to FIG. 2.

Figure 7:
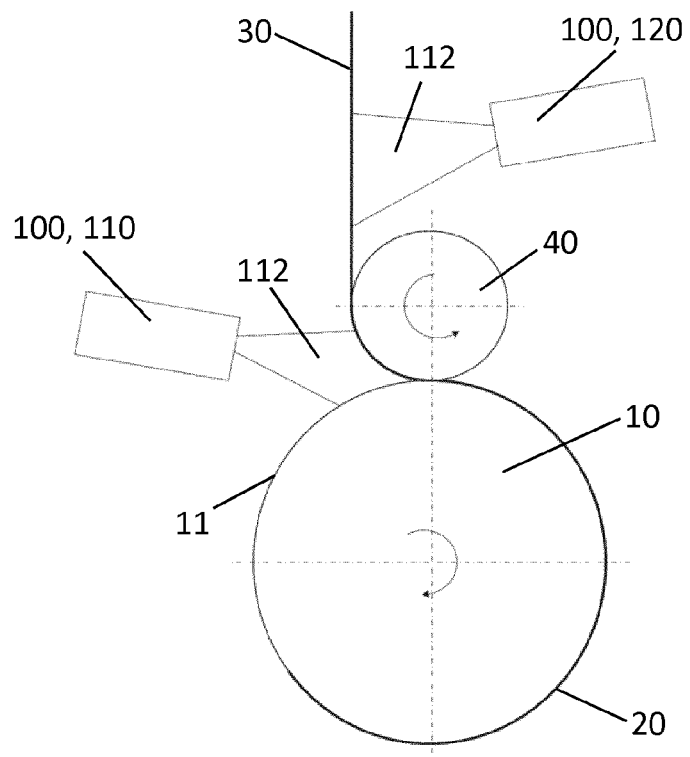
FIG. 7 shows a schematic section through a device according to the invention in accordance with another embodiment of the present invention.

FIG. 7 illustrates another embodiment of the device according to the invention, which comprises a second laser diode array 120 in addition to the first laser diode array 110. The second laser diode array 120 also comprises a multiplicity of laser diodes 111, which are designed to irradiate a rear side of the strip 30 situated opposite the heating surface 32 of the strip 30. An appropriate design of the device ensures that the temperature of the front side of the strip 30 and of the rear side of the strip 30 can be adjusted to one another in an even better way, bringing about a more stable reinforcing structure 20 after the cooling of the reinforcing structure 20 since lower thermal stresses remain in the reinforcing structure 20. It can furthermore be seen from FIG. 7 that the first laser diode array 110 emits only a single beam cone 112, which irradiates both the strip 30 and the molded body 10 or the already formed reinforcing structure 20.

FIGS. 8 and 9 illustrate a three-dimensional representation of the device illustrated in FIGS. 2 and 6. Here, it can be seen that the contact pressure roller 40 is held by means of a holding device 41, wherein a pressure force F can be exerted on the contact pressure roller 40 in the direction of the molded body 10 by means of the holding device 41.

The molded body 10, which is illustrated in simplified form as a cylinder segment 10 in FIGS. 8 and 9, is made to rotate by means of the translation and/or rotation unit 60.

It can furthermore be seen from FIGS. 8 and 9 that cooling water connections 106 are provided on the irradiation module 100, by means of which connections the irradiation module 100 and the laser diode arrays 110 can be cooled. The radiation field emitted by the irradiation module 100 irradiates a region of contact between the contact pressure roller 40 and the molded body 10.

The laser diode array 110 can be controlled in such a way that the above-described laser light intensity profiles on heating surface 32 and heating surface 12 can be achieved.

The device furthermore comprises an image monitoring unit 150 in the form of an infrared camera 150, in the observation cone 151 of which the region of contact between the contact pressure roller 40 and the molded body 10 is arranged. Thus, the temperature profile both of the strip 30 (not illustrated in FIGS. 8 and 9) and of the molded body 10 or of the already formed reinforcing structure 20 can be determined. For example, the laser diode array 110 can be controlled in such a way by means of a feedback loop that the temperature of the strip 30 and of the molded body 10 or of the already formed reinforcing structure 20 is raised to a substantially identical temperature.

Figure 10:
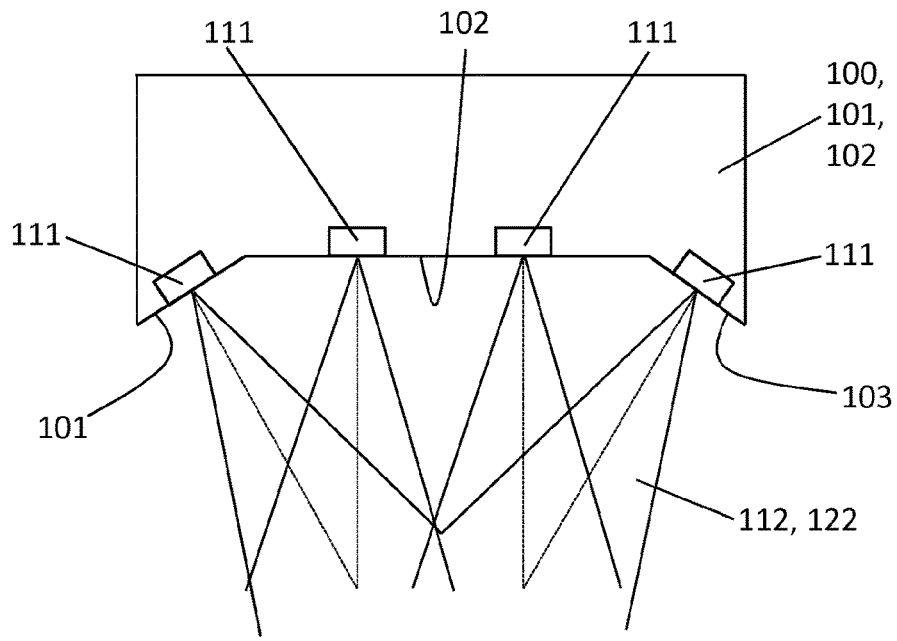
FIG. 10 shows a schematic section through an irradiation module with laser diodes arranged in the irradiation module, these being part of a laser diode array.

An irradiation module 100 is illustrated schematically in cross section in FIG. 10. It can be seen that the irradiation module has three emission surfaces 101, 102 and 103. In this case, one laser diode 111 in each case is arranged in the first emission surface 101 and the third emission surface 103, whereas two laser diodes 111 are arranged in the second emission surface 102. However, the present invention is not restricted to a corresponding number of laser diodes. On the contrary, a multiplicity of laser diodes 111 is arranged in the individual emission surfaces. Furthermore, the present invention is not restricted to having just two or three emission surfaces; on the contrary, the irradiation module can have a multiplicity of emission surfaces, in each of which one laser diode 111 or a multiplicity of laser diodes 111 is arranged. In this case, the respective emission surfaces 101, 102 and 103 face the heating surface 32 of the strip and also the heating surface 12 of the molded body 10.

It can be seen from FIG. 10 that the normal vectors of the emission surfaces 101, 102 and 103 are not parallel to one another and are directed toward one another in the direction of the heating surfaces 12, 32. Consequently, the emission direction vectors of the laser diodes 111 arranged in the respective surfaces 101, 102, 103 are not parallel to one another either but are directed toward one another in the direction of the heating surfaces 12, 32. This has the effect that the beam divergence of the respective laser diodes 111 is compensated, making it possible to achieve a larger processing clearance between the irradiation module 100 and the heating surfaces 12, 32 and also furthermore to achieve the intensities necessary for heating both the strip 30 and the molded body 10. Moreover, imaging optics or collimation optics between the irradiation module 100 and the molded body 10 can be avoided through a corresponding design of the irradiation module 100.

Figure 11:
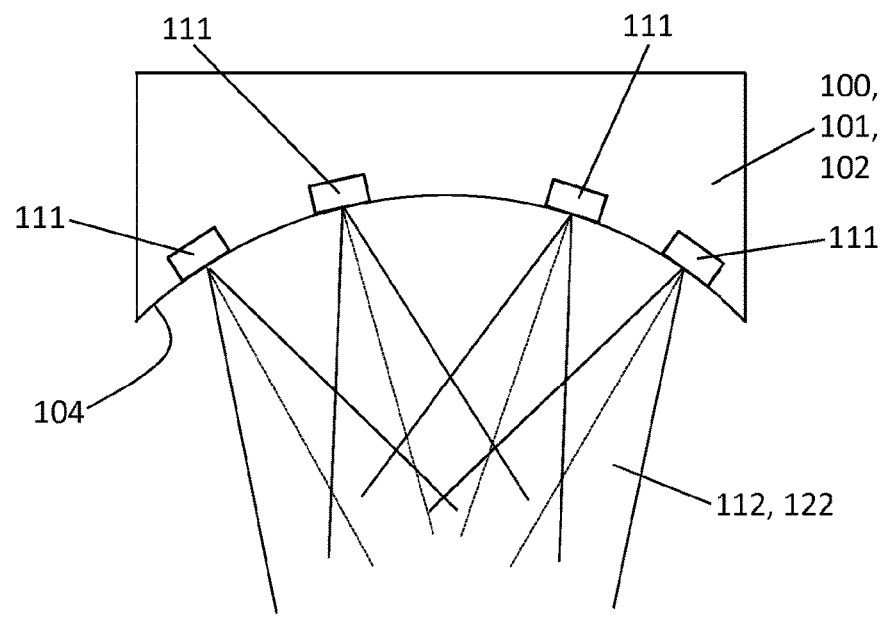
FIG. 11 shows an alternative embodiment of the irradiation module with a multiplicity of laser diodes arranged at an emission surface of the irradiation module.

FIG. 11 illustrates a modification of the irradiation module 100, which has only a single emission surface 104, but this is of concave design. A multiplicity of laser diodes 111 is arranged in the emission surface 104, wherein the laser diodes 111 of the laser diode array 110, which are arranged spaced apart, have emission direction vectors which are aligned parallel to the respective local normal vectors of the emission surface 104 surrounding them, so that the emission direction vectors of the laser diodes 111 are also aligned in a nonparallel manner to one another and are directed toward one another in the direction of the heating surface 12, 32. Once again this ensures that the beam divergence of the respective laser diodes 111 is compensated, making it possible, on the one hand, to achieve increased intensity on the heating surfaces 12, 32, enabling the clearance between the irradiation module 100 and the heating surfaces 12, 32 to be increased and furthermore ensuring that collimation optics between the irradiation module 100 and the heating surfaces 12, 32 are not absolutely necessary.

Figure 12:
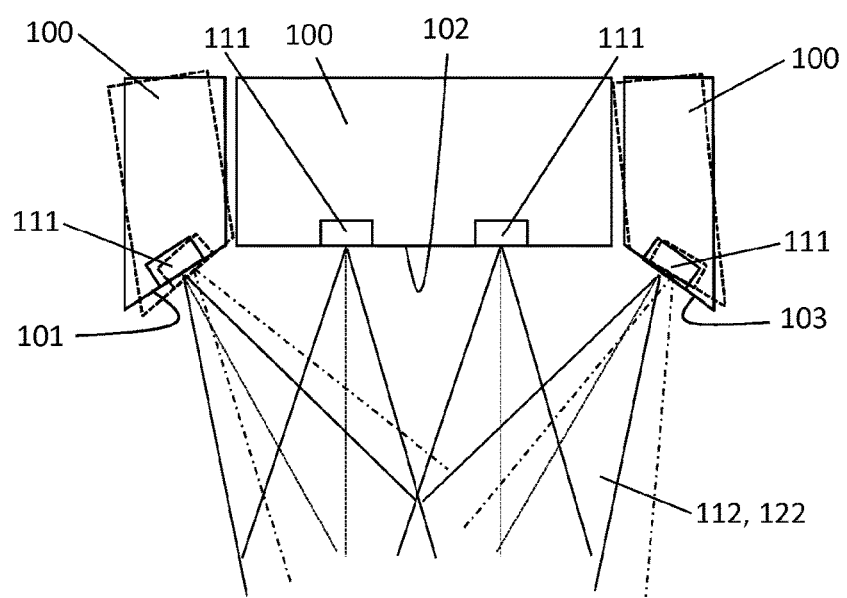
FIG. 12 illustrates schematically, in cross-section, a modification of the irradiation module.

FIG. 12 illustrates schematically, in cross section, a modification of the irradiation module 100. It can be seen that the irradiation module comprises three segments, which correspondingly have three emission surfaces 101, 102 and 103. In this case, one laser diode 111 in each case is arranged in the first emission surface 101 and the third emission surface 103, whereas two laser diodes 111 are arranged in the second emission surface 102. However, the present invention is not restricted to a corresponding number of laser diodes. On the contrary, a multiplicity of laser diodes 111 is arranged in the individual emission surfaces. Furthermore, the present invention and, in particular, the present embodiment of the laser module 100 illustrated in FIG. 12 is not restricted to having just two or three emission surfaces; on the contrary, the irradiation module 100 can have a multiplicity of emission surfaces, in each of which one laser diode 111 or a multiplicity of laser diodes 111 is arranged. In this case, the respective emission surfaces 101, 102 and 103 face the heating surface 32 of the strip 30 and also the heating surface 12 of the molded body 10.

It can be seen from FIG. 12 that the normal vectors of the emission surfaces 101, 102 and 103 are not parallel to one another and are directed toward one another in the direction of the heating surfaces 12, 13. However, the irradiation module 100 can also be designed in such a way that the individual segments of the irradiation module or the emission surfaces 101, 102 and 103 of the irradiation module 100 are parallel to one another.

FIG. 12 furthermore shows that the angles of the segments of the irradiation module 100 which are arranged on the left and right are variable relative to the central segment of the irradiation module 100, i.e. angles enclosed by two adjacent emission surfaces can be changed. To be more precise, the angle between emission surface 101 and emission surface 102 can be changed. In the illustrative embodiment shown, the segment illustrated on the left has been turned counter-clockwise from the initial position (segment illustrated in dashed lines), with the result that the beam cone 112 (illustrated in dash-dotted lines) emitted by the laser diode 111 illustrated on the left has also been turned counterclockwise. This causes an increase in intensity in a particular region of the heating surface 32 or 12 since the beam cones overlap on the heating surfaces. It can furthermore be seen from FIG. 12 that the segment of the irradiation module 100 which is illustrated on the right has likewise been tilted or turned counterclockwise. This is associated with a corresponding tilt of the strike path 112 (illustrated in dash-dotted lines) illustrated on the right in figure twelve.

However, the present invention is not restricted to tilting the individual segments of the irradiation module 100 with the same orientation. Oppositely oriented tilting of the individual segments of the irradiation module 100 is likewise possible.

Although not illustrated in FIG. 12, the turning or tilting of the individual segments can be performed by electric motor. The individual segments can likewise be driven by means of a piezoelectric device. It is also possible for the individual segments to be arranged on acceptable theoretical in relation to each other.

Although the individual laser diodes 111 are arranged in different segments of the irradiation module 100, the laser diodes 111 nevertheless belong to one and the same laser diode array 110, 120.

However, it is also possible for laser diode arrays that differ from one another to be arranged in the individual segments of the irradiation module 100. Here, the different laser diode arrays are controlled in a coordinated manner, thus allowing the desired beam intensity profiles on the heating surfaces 12, 32 to be achieved.

Although not illustrated in the figures, the laser diodes 111 are preferably each "surface emitters" 111, which are also referred to as VCSEL (vertical cavity surface emitting laser). Correspondingly designed laser diodes 111 have less beam divergence, and therefore once again the advantages are achieved that increased intensities on the heating surfaces 12, 32 can be obtained, the processing clearance between the irradiation module 100 and the heating surfaces 12, 32 can be increased, and imaging optics between the irradiation module 100 and the heating surfaces 12, 32 can be avoided.

LIST OF REFERENCE SIGNS 1 pressurized container
2 opening (of the pressurized container)
3 connection element (of the pressurized container)
10 molded body/substrate/inner container of the pressurized container
11 molded body surface
12 heating surface (of the molded body/reinforcing structure)
20 reinforcing structure/supporting sleeve (of a pressurized container)
30 strip
31 contact pressure region/contact pressure portion (of the strip)
32 heating surface (of the strip)
40 contact pressure unit, contact pressure roller
41 holding device (of the contact pressure unit)
50 impact protector
60 translation and/or rotation unit
70 heating unit
100 irradiation module
101, 102, 103 emission surface (of the irradiation module)
104 emission surface (of the irradiation module)
106 cooling water connection (of the irradiation module)
110 (first) laser diode array
111 laser diode/surface emitter/VCSEL (of the laser diode array)
112 beam cone (of the (first) laser diode array)
120 (second) laser diode array
122 beam cone (of the (second) laser diode array)
130 emission direction vector (of a laser diode)
140 control unit (for the laser diode array)
150 image monitoring unit/infrared camera
151 observation cone ( )
F contact pressure force
I radiation intensity
Imin minimum radiation intensity
Imax maximum radiation intensity
R1 direction of relative motion
R2 pulling direction
s heating section/length (of the respective heating surfaces)
Tv temperature of the front side of the strip
Tr temperature of the rear side of the strip
Ts setpoint temperature of the strip
T0 initial temperature of the strip

What is claimed is:

1. A device for producing a reinforcing structure, which comprises a fiber-reinforced strip including a thermoplastic material, on a molded body surface of a molded body, the device comprising:

a contact pressure unit for pressing the strip onto the molded body surface;

the strip positionable between the contact pressure unit and the molded body surface such that a contact pressure region of the strip is bringable into contact with the contact pressure unit and the molded body surface, whereby the strip is subjectable to a force in a direction of the molded body surface by means of the contact pressure unit;

a translation and/or rotation unit coupled in terms of motion to the molded body and/or to the contact pressure unit such that a motion and/or a rotation of the molded body relative to the contact pressure unit can be achieved is achievable, whereby the strip is applyable to the molded body surface, wherein, during application of the strip to the molded body surface, the contact pressure unit moves in a direction of relative motion (R1) with respect to the molded body surface, and the strip is pulled in a pulling direction (R2) in relation to the contact pressure unit;

at least one laser diode array having a multiplicity of laser diodes for irradiating a heating surface of the strip ahead of the contact pressure region of the strip in the pulling direction (R2), and/or for irradiating a heating surface of the molded body after the contact pressure region of the strip in the direction of relative motion (R1);

the strip is meltable locally in the region of the heating surface thereof and/or the molded body surface is meltable locally in the region of the heating surface thereof by irradiation by the laser diode array to join the strip to the molded body by pressing the strip onto the molded body surface by the contact pressure unit;

wherein the at least one laser diode array is configured to emit a radiation field which provides a nonuniform intensity distribution on the heating surface of the strip such that a radiation intensity on the heating surface at least in one section of the strip decreases in the pulling direction (R2), and wherein respective emission direction vectors of at least two laser diodes of the at least one laser diode array are aligned in a nonparallel manner to one another and are directed toward one another in a direction of the heating surface of the strip and/or the heating surface of the molded body.

2. The device as claimed in claim 1, further comprising a heating unit, by which the strip ahead of the heating surface in the pulling direction (R2) is heatable to a predetermined temperature.

3. The device as claimed in claim 1, further comprising:
a second laser diode array in addition to the first laser diode array, the second laser diode array being configured to heat the heating surface of the strip, which heating surface is to be brought into contact with the molded body; and
the second laser diode array comprises a multiplicity of laser diodes for irradiating a rear side of the strip situated opposite the heating surface of the strip.

4. The device as claimed in claim 1, wherein the at least one laser diode array is adapted to irradiate the heating surface of the molded body after the contact pressure region in the direction of relative motion (R1), wherein the laser diode array is adapted to emit a radiation field which causes such a nonuniform intensity distribution on the heating surface of the molded body that the radiation intensity on the heating surface at least in one section of the molded body decreases counter to the direction of relative motion (R1).

5. The device as claimed in claim 1, wherein the laser diode array is adapted to heat the respective heating surfaces of the strip and of the molded body to different temperatures in the regions immediately ahead of a line of contact of the strip with the molded body.

6. The device as claimed in claim 1, wherein the contact pressure unit is configured as a contact pressure roller having an outer surface of an elastomeric material, whereby the contact area between the contact pressure roller and the strip increases as the strip is pressed onto the molded body with an increasing force by the contact pressure roller.

7. The device as claimed in claim 1, wherein the contact pressure unit in the region that is bringable into contact with the strip and with the molded body is substantially transparent for the radiation emitted by the laser diode array.

8. The device as claimed in claim 1, further comprising:
an irradiation module comprising the laser diode array;
the irradiation module has at least two emission surfaces, each facing the heating surface of the strip and/or the heating surface of the molded body;
at least one laser diode of the at least one laser diode array is arranged in each of the emission surfaces, wherein the emission direction vector of the laser diode is oriented parallel to the normal vector of the emission surface; and
an angle enclosed by two adjacent emission surfaces is changeable.

9. The device as claimed in claim 1, further comprising:
an irradiation module comprising the laser diode array;
the irradiation module has at least two emission surfaces, each facing the heating surface of the strip and/or the heating surface of the molded body;
at least one laser diode of the at least one laser diode array is arranged in each of the emission surfaces, wherein the emission direction vector of the laser diode is oriented parallel to the normal vector of the emission surface; and
the normal vectors of the emission surfaces are aligned in a nonparallel manner to one another and are directed toward one another in the direction of the heating surface of the strip and/or the heating surface of the molded body.

10. The device as claimed in claim 1, further comprising:
an irradiation module comprising the laser diode array;
the irradiation module has at least one emission surface facing the heating surface of the strip and/or the heating surface of the molded body,
the emission surface/emission surfaces is/are at least one emission surface of concave design; and
the laser diodes of the at least one laser diode array are arranged spaced apart in the at least one emission surface, wherein respective emission direction vectors of the laser diodes are oriented parallel to the local normal vectors of the at least one emission surface surrounding them.

11. The device as claimed in claim 1, wherein at least a portion of the laser diodes of the at least one laser diode array are spaced apart in a non-equidistant manner.

12. The device as claimed in claim 1, wherein the laser diodes of the laser diode array are configured as surface emitters.

13. The device as claimed in claim 1, wherein collimation imaging optics are arranged optically downstream of the laser diode array.

14. The device as claimed in claim 1, wherein an emission output of the individual laser diodes of the laser diode array are separately settable by a control unit.

15. The device as claimed in claim 1, wherein the reinforcing structure is a supporting sleeve of a pressurized container and the molded body is an inner container of the pressurized container.

16. A method for producing a reinforcing structure, which comprises a fiber-reinforced strip including a thermoplastic material, on a molded body surface, wherein the method has the following method steps:
positioning the strip between a contact pressure unit and a molded body surface in such a way that a contact pressure portion of the strip is in contact with the contact pressure unit and the molded body surface,
subjecting the contact pressure unit to a force in the direction of the molded body surface, such that the strip is pressed onto the molded body surface;
moving and/or rotating the molded body relative to the contact pressure unit such that the molded body and the contact pressure unit perform a relative movement and/or a relative rotation with respect to one another, whereby the strip is applied to the molded body surface, wherein the contact pressure unit moves in a direction of relative motion (R1) with respect to the molded body surface, and the strip is pulled in a pulling direction (R2) in relation to the contact pressure unit;

irradiating a heating surface of the strip ahead of the contact pressure region of the strip in the pulling direction (R2), and/or irradiating a heating surface of the molded body after the contact pressure region in the direction of relative motion (R1), by means of a multiplicity of laser diodes of a laser diode array; and locally melting the strip in the region of the heating surface thereof and/or the molded body surface in the region of the heating surface thereof by means of the laser diode array, such that the strip is joined to the molded body by pressing the strip onto the molded body surface by means of the contact pressure unit, wherein the method is characterized in that the laser diode array is controlled such that the laser diode array generates a radiation field which causes such a nonuniform intensity distribution on the heating surface of the strip that the radiation intensity on the heating surface of the strip decreases in the pulling direction (R2), at least in sections.

17. The method as claimed in claim 16, wherein before the irradiation of the heating surface, the strip ahead of the heating surface in the pulling direction (R2) is heated to a predetermined temperature by means of a heating unit.

18. The method as claimed in claim 16, wherein a rear side of the strip situated opposite the heating surface of the strip is heated by means of a second laser diode array.

19. The method as claimed in claim 16, wherein the laser diode array emits a radiation field which causes such a nonuniform intensity distribution on the heating surface of the molded body that the radiation intensity on the heating surface of the molded body decreases counter to the direction of relative motion (R1), at least in sections.

* * * * *